June 20, 1939. L. CALDWELL 2,163,525
METHOD OF PREPARING A DECOLORIZING MATERIAL
Filed Feb. 11, 1936
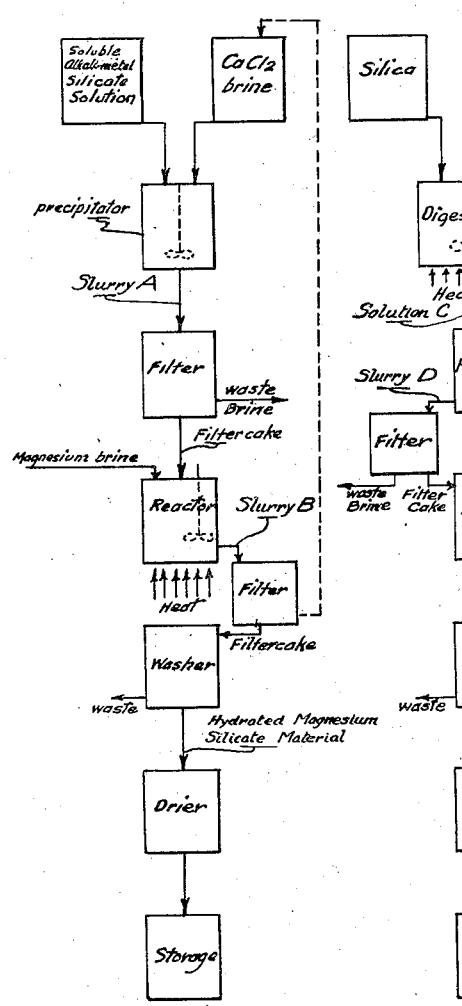
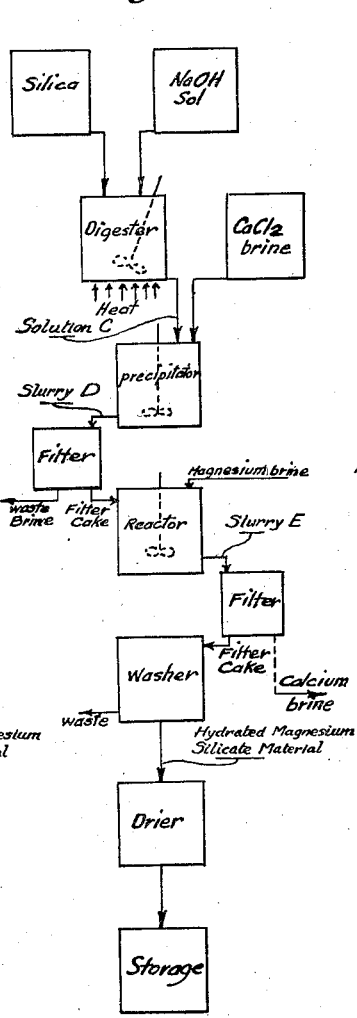
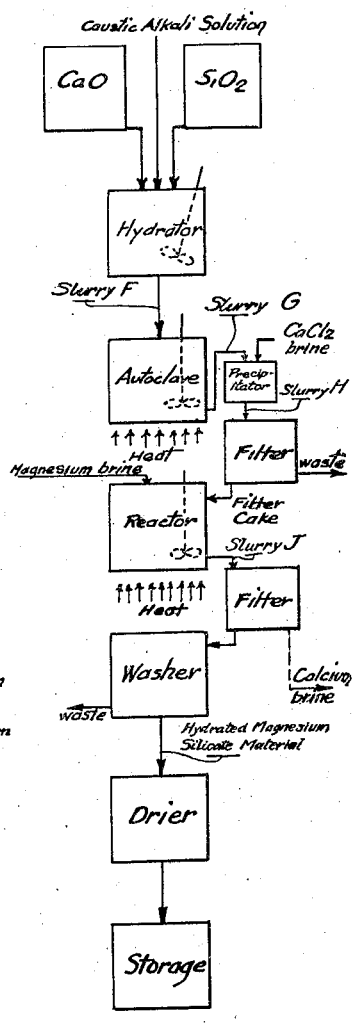
INVENTOR.
Lyle Caldwell,
BY
ATTORNEYS.

Patented June 20, 1939

2,163,525

UNITED STATES PATENT OFFICE 2,163,525

METHOD OF PREPARING A DECOLORIZING MATERIAL

Lyle Caldwell, Los Angeles, Calif.

Application February 11, 1936, Serial No. 63,376

8 Claims. (Cl. 252—2)

This invention relates to the preparation of decolorizing materials and pertains particularly to a method of producing, by synthesis, decolorizing or bleaching materials of advantageous physical properties, in an economical manner.

This application is a continuation-in-part of my co-pending application Ser. No. 18,343, filed April 26, 1935, said co-pending application disclosing the production of a hydrated magnesium silicate bleaching material by hydrothermal reaction of a hydrated calcium silicate with a soluble salt of magnesium.

One of the particular objects of the present invention is to provide for the production of a synthetic magnesium silicate decolorizing material by an improved procedure which is highly advantageous with respect to the cost of raw materials, the simplicity of the apparatus required, and low cost and ease of control of the procedure itself.

The product produced according to the present invention comprises, essentially, a hydrated magnesium silicate which may, under some circumstances of manufacture, be chemically and/or physically associated with other siliceous materials, such as calcium silicate, aluminum silicate, silicic acid, or the like, which other materials may or may not have some decolorizing efficiency in themselves. Similarly, the hydrated magnesium silicate may be associated chemically and/or physically with relatively inert materials in a minor proportion, dependent upon the nature of the starting materials and the reaction procedure followed in the preparation of such hydrated magnesium silicate.

The process of the present invention may comprise the formation of a hydrated calcium silicate by aqueous reaction of a soluble alkali metal silicate with a calcium salt which is reactive therewith to form such calcium silicate, together with a soluble alkali metal salt, in a precipitation step, and then subjecting said hydrated calcium silicate to reaction with a soluble magnesium salt to cause substantially complete conversion thereof to a hydrated magnesium silicate, said soluble magnesium salt comprising a salt of an acid stronger than silicic acid. The alkali metal salt produced in the above-mentioned precipitation step is preferably separated from the precipitated calcium silicate prior to reaction of the latter with the soluble magnesium salt. The hydrated calcium silicate may be prepared according to any one of a plurality of procedures, each of which will preferably embody a precipitation step, dependent upon the raw materials at hand and the character of the available process equipment.

According to the teaching in Ser. No. 18,343, a calcium-containing silicate material is subjected to a base-exchange reaction with a soluble magnesium salt to form a hydrated magnesium silicate bleaching material, at a super-atmospheric temperature and preferably at a super-atmospheric pressure. Relatively long reaction periods at relatively elevated temperatures have been hitherto required, to effect the desired base-exchange reaction, even with such hydrated calcium-containing silicates as are disclosed in said co-pending application. According to the present disclosure a more active form of calcium silicate is produced, by precipitation according to the procedure above described, and the resulting highly active calcium silicate may be reacted with the soluble magnesium compound at a much lower temperature, or in a much shorter time, rendering the process more economical. In addition to the direct benefits of the reduced temperature-time requirements of the reaction, such as heat economies or the like, additional economies result with respect to the useful life of the reaction equipment, it being appreciated that most soluble magnesium compounds are relatively corrosive to ordinary metals and when the time feature is reduced, the corrosion problem becomes less acute. Furthermore, I have found that magnesium silicate bleaching materials of especially advantageous bleaching or decolorizing properties may be produced by the method herein described.

Another advantage of the present process is that the base-exchange reaction may be carried out with magnesium salt solutions of lower concentration that have been practicable with less active forms of calcium silicate. This is believed to be a direct result of the increased activity of the present described precipitated form of hydrated calcium silicate.

A further advantage resides in the fact that a calcium-bearing brine or the like may be utilized as the source of calcium in preparing the calcium silicate for use in the base-exchange reaction. This not only increases the field of available raw materials, but also enables a further economy to be realized in cases where the magnesium salt employed is such as to form a soluble calcium salt in the base-exchange reaction, since the resulting solution of said soluble calcium salt, after separation from the magnesium silicate product, may be employed as the source of calcium in preparation of a further quantity of calcium silicate.

The present process therefore makes possible the use of relatively inexpensive reaction equipment and may be practiced at an important saving in the cost of raw materials and the expense of carrying out the reaction.

The alkali metal silicate employed in the precipitation step may, for example, be sodium silicate or potassium silicate, and is preferably introduced in aqueous solution, and preferably contains a molecular excess of silica over the alkali metal.

I prefer to employ a soluble calcium salt, such as calcium chloride, calcium nitrate, or calcium bromide, for reaction with the alkali metal silicate in the precipitation step. However, I have found that difficultly soluble calcium salts, such as calcium sulphate, may also be employed, the essential requirement being that the calcium salt is one which will react with the alkali metal silicate, in the presence of water, to cause precipitation of hydrated calcium silicate.

The magnesium salt used in the base-exchange reaction is a soluble magnesium salt of an acid stronger than silicic acid, among which magnesium chloride and magnesium sulphate are the most desirable from the standpoint of cost and availability.

The process is subject to considerable variation with respect to specific materials employed, the proportions of such materials, the degree of concentration thereof in the aqueous reaction steps, and the temperature, time and other operating conditions employed in the several steps, as will be apparent from the specific examples described hereinafter.

The accompanying drawing illustrates, in diagram, flow sheets which may be employed according to the hereinafter described specific procedures for the preparation of hydrated magnesium silicate decolorizing materials according to the present invention, and referring thereto:

Fig. 1 illustrates a flow sheet which may be employed when the hydrated calcium silicate is formed wholly by a precipitation reaction between a soluble calcium compound and an alkali metal silicate;

Fig. 2 illustrates a flow sheet of a process comparable to that shown in Fig. 1, in which the alkali metal silicate is produced in the presence of excess silica; and Fig. 3 shows a flow sheet of a process involving the preparation of hydrated calcium silicate by hydrothermal reaction of silica and lime in the presence of a caustic alkali, in the production of a reactive mix which may be employed in the formation of additional quantities of hydrated calcium silicate by precipitation.

Referring to Fig. 1, a soluble silicate, such as commercial sodium silicate having a preferred $Na_2O:SiO_2$ ratio in the neighborhood of 1:2.5 to 1:3, is introduced into a precipitator in which it is contacted with a solution of a soluble calcium salt, such as a $CaCl_2$ brine, preferably under conditions of agitation, to cause precipitation of hydrated calcium silicate, and the resulting slurry A, containing said precipitate, is then passed to a filter. The filtrate, which may contain principally NaCl, may be passed to waste or salt recovery as desired, and the cake is preferably washed. The washed cake, which may consist principally of hydrated calcium silicate dependent upon the ratio of $Na_2O:SiO_2$ in the soluble silicate, is introduced into a reaction vat and an adequate amount of a suitable brine containing a soluble magnesium compound such as magnesium chloride is added to this vat, preferably in such proportions as to provide a molal relation in the neighborhood of 1:1 between the added $Mg^{++}$ and the $Ca^{++}$ in the calcium silicate precipitate. The reaction vat is preferably heated to a temperature at least in the neighborhood of 100° C., and the contact between the calcium silicate precipitate and the soluble magnesium compound is preferably maintained for from fifteen minutes to one and one-half hours or more, to cause a base-exchange reaction between the magnesium salt and the calcium silicate, resulting in formation of solid hydrated magnesium silicate and a salt of calcium and the acidic radical of the added magnesium salt. The mixture, designated in the drawing as slurry B, may then be withdrawn to a filter, the cake being subsequently washed, dried, and pulverized to the desired degree.

This process has been carried out with a relatively dilute magnesium brine, more specifically, sea water which contained approximately three parts $MgCl_2$ and one and one-half parts $MgSO_4$ per thousand. In the event that a relatively concentrated magnesium chloride brine is employed, the filtrate from the filtration operation following the magnesium reaction will contain an important concentration of $CaCl_2$, and such filtrate may be employed in the primary precipitation step, being returned to the $CaCl_2$ brine storage as indicated by the dotted line in Fig. 1.

As a specific example of the practice of this embodiment of the invention, one hundred parts of commercial sodium silicate (containing 30.94 parts $SiO_2$ and 18.8 parts $Na_2O$) diluted with five hundred parts of water, was precipitated with an excess of $CaCl_2$ dissolved in five hundred parts of water (molecular excess of $Ca^{++}$ over $Na_2O$). The precipitate was thoroughly agitated to break down agglomerates, filtered, washed and boiled with one thousand parts of brine containing 11.1 parts $MgCl_2$ per thousand. The resulting slurry was then filtered, washed, and dried, and showed a decolorizing efficiency on a Mid-Continent lubricating oil which was comparable to the bleaching efficiency of a very good grade of commercially available acid-treated clay. This same product showed a higher bleaching efficiency on Pennsylvania oil than did such acid-treated clay.

Referring to the flow sheet illustrated in Fig. 2, silica may be digested with an aqueous solution of caustic, such as NaOH, to form a soluble silicate of any desired $Na_2O:SiO_2$ ratio, by partial or complete solution of the silica, and the resulting mixture, designated as solution C, is then precipitated with a suitable calcium-containing brine according to the procedure outlined in connection with the flow sheet illustrated in Fig. 1. The resulting slurry D, containing a precipitate consisting principally of hydrated calcium silicate together with any uncombined silica, may be filtered, washed, and reacted with a magnesium brine, to form a slurry E containing hydrated magnesium silicate, and said slurry E may be treated to recover said magnesium silicate, in the same manner as in Fig. 1. As a specific example of the practice of this embodiment of the invention, one hundred parts of commercial diatomaceous earth analyzing approximately 90% $SiO_2$, was made into a slurry with five hundred parts of water containing 35.5 parts of technical caustic, equivalent to 31.6 parts NaOH, and digested under agitation for two hours. Approximately 63 parts $SiO_2$ were taken into solution and the resulting slurry including the undigested silica was precipitated with an excess of calcium chloride in three thousand parts of water, filtered, and the resulting precipitate thoroughly washed. The net weight of this precipitate was calculated to be approximately one hundred parts, the composition of which was calculated to be 37% $CaSiO_3.H_2O$, 42% hydrated silica, and 21% undigested diatomaceous silica (it being appreciated that the hydrated silica may have been at least partly associated with the calcium silicate in the formation of a compound having a composition expressed by $CaO.nSiO_2-nH_2O$). This precipitate was made into a slurry with 1500 parts of water containing 39 parts $MgCl_2$, and boiled for a short time. The resulting precipitate was filtered, washed, and dried, and showed a decolorizing efficiency entirely comparable to the above-described product prepared according to the flow sheet shown in Fig. 1.

Referring to the flow sheet shown in Fig. 3, quick-lime and silica may be slurried with water under agitation to produce a thorough hydration of the quick-lime, preferably in the presence of caustic alkali such as NaOH. This mixture, slurry F, is then preferably autocleved to effect a hydrothermal reaction, for a period of one or two hours at a gauge pressure of 350 to 500 p. s. i. In this autoclaving the calcium hydroxide reacts with the silica in the direct formation of hydrated calcium silicate and the added caustic alkali appears to facilitate this reaction. A molecular excess of silica over lime is preferably employed, and the proportion of caustic alkali added is preferably established at such value with respect to the excess silica that a soluble sodium silicate of the desired $Na_2O:SiO_2$ ratio will result. The mixture, slurry G, formed by this hydrothermal reaction, comprising essentially hydrated calcium silicate and a soluble alkali metal silicate, is then preferably mixed with a solution of a soluble calcium salt such as $CaCl_2$, to effect precipitation of a further quantity of hydrated calcium silicate by reaction of such calcium salt with the sodium silicate present, the further calcium silicate thus formed being precipitated upon the surface or in intimate mixture with the calcium silicate already present. The resulting mixture, slurry H, is then filtered, to separate the soluble reaction products of the precipitation reaction from the calcium silicate, which is then slurried with a suitable magnesium brine and reacted at an elevated temperature from fifteen minutes to one and one-half hours or more, as above-described. The resulting product, slurry J, may then be filtered, washed, dried, and pulverized.

It will be appreciated that it is not essential to employ a soluble calcium compound in the formation of the hydrated calcium silicate from which the hydrated magnesium silicate is produced, inasmuch as the above-described procedures may be carried out by reacting the soluble silicate with an insoluble calcium salt such as calcium sulphate, the alkali of the soluble silicate associating itself with the cation of the insoluble calcium salt, in the formation of a soluble alkali metal salt such as sodium sulphate which may be separated from the relatively insoluble hydrated calcium silicate by filtration or decantation.

The process of the present invention is highly adapted to practice with calcium chloride where magnesium chloride is employed in the base-exchange reaction, inasmuch as the filtrate from such base-exchange reaction will consist principally of calcium chloride in solution, which may be employed for precipitation with a further amount of soluble silicate as pointed out above, thus providing a cyclic re-utilization of the calcium.

Where the soluble magnesium salt comprises magnesium sulphate, it will be appreciated that the association of the calcium from the calcium silicate with the cation of such magnesium sulphate will result in the formation of the relatively insoluble calcium sulphate, which is necessarily recovered with the hydrated magnesium silicate. The presence of this insoluble calcium sulphate will, in most cases, be found unobjectionable in view of the relatively inert nature thereof.

As above pointed out, the hydrated calcium silicates produced and employed according to the present described invention are relatively highly active as compared with the calcium silicates which I have heretofore found suitable in the base-exchange reaction with the soluble magnesium salt, whereby such base-exchange reaction has been found to progress at a lower temperature or at a faster rate than has been hitherto obtainable, and a greater dilution of such soluble magnesium salt may be employed. In general, the employment of temperatures requiring super-atmospheric pressures, in the base-exchange reaction, will accelerate such reaction to a marked degree, and it will be appreciated that the present invention fully contemplates the use of such elevated temperature and pressure conditions in this phase of the process, if desired. However, temperatures of about 100° C. have been found adequate, as shown by the above examples. Thus, the use of this highly reactive precipitated form of hydrated calcium silicate, in the base-exchange reaction for the formation of hydrated magnesium silicate, permits marked economies to be obtained, either by carrying out this reaction at a lower temperature, such as 100° C., or by carrying out the reaction in a much shorter time, at more elevated temperatures.

In the appended claims, the expression "reactive calcium salt" will be understood to designate a calcium salt which will react with a soluble alkali metal silicate in the formation of a hydrated calcium silicate and a soluble alkali metal salt, according to the present disclosure. Numerous calcium salts are known to function in this reaction, such as calcium bromide, calcium iodide, calcium nitrate, and calcium monophosphate, in addition to the above-mentioned preferred examples, calcium chloride and calcium sulphate. Calcium chloride and calcium sulphate are at present believed to be the only commercially useful calcium salts, in view of the availability and low cost thereof, but it will be appreciated that the process of the present invention is not to be interpreted as limited to the use of one or the other of these specific calcium compounds.

I claim:

1. The method of producing a hydrated magnesium silicate decolorizing material, which comprises: causing the formation of a precipitated hydrated calcium silicate by reaction in aqueous phase of a water-soluble silicate with a calcium salt which will react with the water-soluble silicate, in the presence of water, to cause precipitation of hydrated calcium silicate, and converting a substantial part of said calcium silicate into a hydrated magnesium silicate by hydrothermal base-exchange reaction thereof with a soluble magnesium salt of a strong acid, to form a decolorizing material of which a substantial proportion consists of hydrated magnesium silicate produced by such reaction.

2. The method of producing a hydrated magnesium silicate decolorizing material which comprises: precipitating a hydrated calcium silicate from an aqueous solution of a water-soluble reactive calcium salt by addition of a water-soluble silicate; separating said hydrated calcium silicate from the soluble reaction products formed by the precipitation thereof; and subjecting said hydrated calcium silicate to hydrothermal reaction with a soluble magnesium salt of a strong acid to cause substantial conversion thereof into a hydrated magnesium silicate and form a decolorizing material of which a substantial proportion consists of such hydrated magnesium silicate.

3. The method of producing a hydrated magnesium silicate decolorizing material, which comprises: digesting silica with an aqueous solution of a caustic alkali to form a mixture comprising a water-soluble silicate and free silica in finely divided condition; reacting said mixture with an aqueous solution of a water-soluble reactive calcium salt to cause precipitation of a hydrated calcium silicate and form a mixture consisting principally of hydrated calcium silicate and said finely divided free silica; and subjecting said last-named mixture to a hydrothermal reaction with a soluble magnesium salt of a strong acid to cause a substantial conversion of said calcium silicate into a hydrated magnesium silicate and form a decolorizing material of which a substantial proportion consists of said hydrated magnesium silicate and free silica.

4. The method of producing a hydrated magnesium silicate decolorizing material which comprises: subjecting finely divided hydrated lime to hydrothermal reaction with a molecular excess of silica in the presence of caustic alkali to cause formation of a mixture consisting principally of hydrated calcium silicate and a water-soluble alkali silicate; treating said mixture with an aqueous solution of a water-soluble reactive calcium salt to cause formation of additional hydrated calcium silicate by reaction with said soluble alkali silicate; separating the hydrated calcium silicate formed by both of such reactions from the bulk of any soluble reaction products formed by such treatment; and subjecting such separated calcium silicate to hydrothermal reaction with a soluble magnesium salt of a strong acid to cause a substantial conversion thereof into hydrated magnesium silicate and form a decolorizing material of which a substantial proportion consists of such magnesium silicate; and recovering said decolorizing material.

5. The method of producing a hydrated magnesium silicate bleaching material which comprises: mixing a solution of a water-soluble alkali metal silicate with a solution of calcium chloride to cause precipitation of hydrated calcium silicate and formation of a soluble alkali metal chloride; separating said soluble chloride from said calcium silicate; and subjecting said hydrated calcium silicate to hydrothermal reaction with a soluble magnesium salt of a strong acid to cause substantially complete conversion of said calcium silicate to hydrated magnesium silicate and form a decolorizing material of which a substantial proportion consists of said hydrated magnesium silicate.

6. The method of producing a hydrated magnesium silicate bleaching material which comprises: mixing a solution of an alkali metal silicate with a solution of calcium chloride to cause precipitation of hydrated calcium silicate and formation of an alkali metal chloride; separating said soluble chloride from said calcium silicate; subjecting said hydrated calcium silicate to hydrothermal reaction with a solution of magnesium chloride to cause formation of calcium chloride in solution and effect substantially complete conversion of said calcium silicate to hydrated magnesium silicate and form a decolorizing material of which a substantial proportion consists of said hydrated magnesium silicate; and recovering the calcium chloride produced in said hydrothermal reaction and utilizing the same in the precipitation of further quantities of calcium silicate in a cyclic utilization of the contained calcium radical.

7. A method of producing a hydrated silicate having activated physical and chemical properties, which comprises reacting a precipitated hydrated calcium silicate with a hot solution of a magnesium salt of a strong acid for a short time sufficient only to convert a substantial portion of the calcium silicate to hydrated magnesium silicate.

8. A precipitated hydrated calcium silicate having activated physical and chemical properties and containing a substantial amount of a hydrated magnesium silicate produced by reaction of a hot solution of a magnesium salt of a strong acid for a short time sufficient only to effect a partial conversion of the calcium silicate to magnesium silicate.

LYLE CALDWELL.